United States Patent [19]

Sakamoto et al.

[11] Patent Number: 4,716,479
[45] Date of Patent: Dec. 29, 1987

[54] MAGNETIC DISK HEAD OPENING MECHANISM WITH AN EXPANDED OPENING RANGE

[75] Inventors: Yuzo Sakamoto; Kazuo Koike, both of Kanagawa, Japan

[73] Assignee: Mitsubishi Denki Kabushiki Kaisha, Tokyo, Japan

[21] Appl. No.: 28,059

[22] Filed: Mar. 19, 1987

Related U.S. Application Data

[63] Continuation of Ser. No. 674,324, Nov. 23, 1984, abandoned.

[30] Foreign Application Priority Data

Nov. 24, 1983 [JP]  Japan ............................ 58-221141

[51] Int. Cl.⁴ ........................................ G11B 21/22
[52] U.S. Cl. ................................................ 360/105
[58] Field of Search ................................. 360/105

[56] References Cited

U.S. PATENT DOCUMENTS

| | | | |
|---|---|---|---|
| 4,250,530 | 2/1981 | Yang | 360/105 |
| 4,423,449 | 12/1983 | Hasegawa | 360/105 |
| 4,433,352 | 2/1984 | De Marco et al. | 360/105 |
| 4,470,088 | 9/1984 | Fick | 360/105 |

Primary Examiner—Robert S. Tupper
Attorney, Agent, or Firm—Staas & Halsey

[57] ABSTRACT

A fulcrum for the swing of an arm 5 holding a first magnetic head 2 is provided by a rotation fulcrum pin 21 which is supported on sloped sidewalls of V-shaped grooves 23. A leaf spring 24 pushes the rotation fulcrum pin 21 against the sloped sidewalls grooves 23 at all times. The opening stroke of the arm 5 is not limited by the fulcrum and the rigidity of the arm 5 at the fulcrum is increased.

9 Claims, 9 Drawing Figures

MAGNETIC DISK HEAD OPENING MECHANISM WITH AN EXPANDED OPENING RANGE

This is a continuation of co-pending application Ser. No. 674,324 filed on Nov. 23, 1984, now abandoned.

BACKGROUND OF THE INVENTION

1. Field of the Invention

The present invention relates to a head arm supporting and opening mechanism in a double-side type magnetic disk device which magnetically records signals on both sides of a flexible magnetic disk, and, more particularly, to an opening mechanism which will accommodate a hard case disk.

2. Description of the Prior Art

A conventional head arm supporting mechanism in a double-sided type magnetic disk device is shown in FIG. 1. A flexible disk 1 spins between a first magnetic head 2 and a second magnetic head 3. A carriage 4 holds the second magnetic head 3 while an arm 5 holds the first magnetic head 2. The arm 5 is held by a leaf spring 6 secured to the carriage 4 where the leaf spring 6 provides a fulcrum point for swinging the arm 5. A bracket 7 and screw 9 secure the leaf spring 6 to the carriage 4 and determines the fulcrum and bending force for the arm 5. An arm pressurizing spring 8 exerts a closing force on the arm 5. A lift member 5a is provided on the arm 5 and is connected to an arm operating plate 10 held on a bridge integral with a door handle (not shown) which is moved when the flexible disk is inserted.

When the flexible disk 1, in a flexible, thin, protective jacket 11, is inserted into the device to a position where it can be subjected to writing or reading, the first magnetic head 2 is lifted as shown in FIG. 2 to prevent interference with the disk 1 as it is being inserted. The arm operating plate 10 raises the lift member 5a provided on the arm 5 so that the arm 5 is swung about the fulcrum provided by the secured end of the leaf spring 6.

Whenever the flexible disk 1 is fixed in the conventional flexible thin protective jacket 11, the head arm supporting mechanism of FIG. 1 is sufficient. However, when the flexible disk 1 is mounted in a protective jacket or hard case 12, as illustrated in FIG. 3, which is more rigid than the material of the conventional protective jacket 11, the magnetic disk device is structured as illustrated by FIG. 4. Flexible disk 1 positioning pins 14 and 15 on spindle 13 are used to position the flexible disk 1 and to transmit rotation to the disk 1. Protrusions 16c and 16d on hard case positioning pins 16a and 16b are used to position the hard case in the X and Y directions. Steps 17a and 17b and steps 16e and 16f position the hard case in the Z direction. The hard case 12 has positioning pin holes 18, 19, 20 and 21, respectively, for the above-described positioning pins, as illustrated in FIG. 3.

When the hard case 12 is inserted into the device, it is necessary to move the hard case 12 vertically to position it at the reading and writing position. During insertion, the hard case 12 is held at an insertion level $H_1$ (FIG. 4) by a guide (not shown), and is then moved in the direction of the arrow Y to a predetermined position. The hard case 12, together with the guide, is then moved in the direction of the arrow Z and positioned at an operating level $H_2$ resting against steps 17a, 17b, 16e and 16f.

When the hard case is moved as described above, the first magnetic head 2 should have an opening stroke or distance of $t+(H_1-H_2)$, where t is the thickness of the hard case 12. To prevent interference between the first magnetic head 2 and the hard case 12, the opening stroke of the first magnetic head 2 is necessarily larger than the stroke necessary for a flexible case disk 1.

The conventional arm supporting system when applied to the hard case 12 suffers from several problems.

First, the leaf spring 6 provides the fulcrum for arm swing and if the opening distance of the arm 5 is increased, it is difficult to keep the mechanical strength of the leaf spring from changing due to the stress applied to the fulcrum when the arm 5 is repeatedly opened and closed. This fulcrum limitation thereby limits the opening stroke of the arm. The leaf spring 6 can be designed by utilizing the general formula for a cantilever in accordance with the equation (1):

$$D = \frac{L^2}{3EH} A \qquad (1)$$

where D is the leaf spring's defection, L is the length of the leaf spring 6, H is the thickness of the leaf spring 6, A is the stress on the leaf spring 6, and E is the spring constant. If it is assumed that A is the allowable stress on the leaf spring 6 and D is the deflection of the leaf spring 6 necessary for the stroke of the arm 5, then equation 1 indicates that either the length L of the leaf spring 6 should be increased or the thickness H should be decreased. However, in practice, it is difficult to increase the length of the leaf spring 6, because of the limited space available for the device. The thickness of the spring in the conventional device is generally as small as 0.1 t and if the thickness is further decreased, the reliability of the device is reduced and it becomes difficult to operate.

Second, when it is necessary to determine whether the surface of the head, which is brought into contact with the flexible disk 1, is smudged or scratched, during normal maintenance of the assembled device or when the output system is out of order it is difficult to observe the surface of the first magnetic head 2 because of the limited travel of the arm 5. In this situation, if the arm 5 is forcibly raised, the leaf spring 6 will be permanently deformed, and can no longer be used.

Third, when the arm 5 is raised by the arm operating plate 10, the leaf spring 6 can be twisted which results in the first magnetic head being permanently angled as indicated by the solid lines in FIG. 5. As a result, the first magnetic head 2 cannot be satisfactorily opened and interference between the hard case 12 and the first magnetic head 2 can occur. The angling of the head 2 due to a twisting moment occurs because of the difference in position between the lift member 5a of the arm 5 and the arm pressurizing spring 8. This problem may be eliminated by changing the position of the arm pressurizing spring 8 to the position of the lift member 5a. However, if this method is employed, then the load is applied to the first and second magnetic heads 2 and 3 in a deflected manner and the heads cannot correctly contact the flexible disk 1 and it is difficult to obtain correct outputs from the disk 1. Therefore, this correction method is not practical. If the trouble is eliminated by employing two lift members (5a) on both sides of the first magnetic head 2, the efficiency associated with assembling the device is reduced.

SUMMARY OF THE INVENTION

It is an object of the present invention to eliminate the above-described difficulties accompanying a conventional head arm supporting mechanism.

It is another object of the present invention to provide an opening mechanism that is easy to assemble.

It is an additional object of the present invention to provide an open mechanism which can open at least ninety degrees to facilitate maintainance.

The above objects are accomplished by a head arm supporting mechanism in a magnetic disk device in which the arm has a pin as its fulcrum. The pin is supported by supporting members each having a V-shaped groove, so that the supporting members are increased in rigidity and, as a result, the operating efficiency is also increased.

These, together with other objects and advantages which will be subsequently apparent, reside in the details of construction and operation as more fully hereinafter described and claimed, reference being had to the accompanying drawings forming a part hereof, wherein like numerals reference to like parts throughout.

DESCRIPTION OF THE PREFERRED EMBODIMENT

Figure 6:
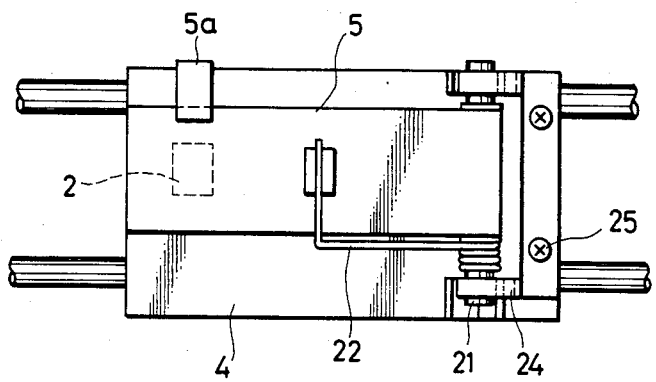
FIGS. 6 and 7 are a plan view and a side view, respectively, showing a magnetic disk device according to the present invention.
Figure 7:
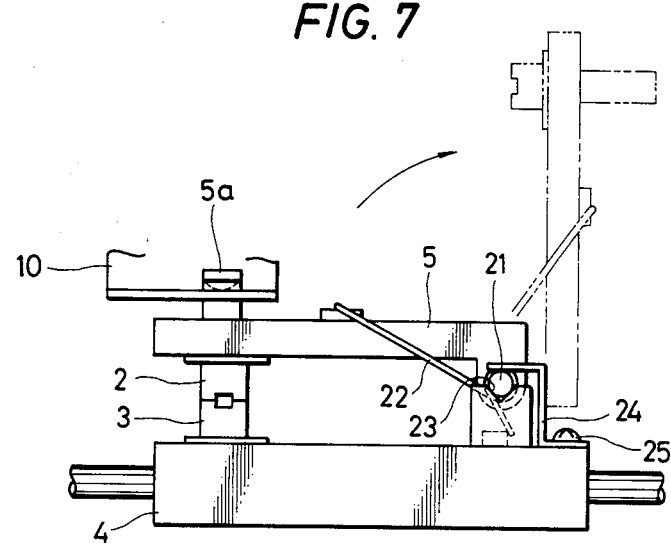

When inserting a flexible disk 1 mounted in a hard case 12 into a magnetic disk device, in accordance with the present invention, as illustrated in FIGS. 6 and 7, lift member 5a of arm 5 is lifted by arm operating plate 10 so that rotation fulcrum pin 21 is turned about the pin 21 central axis. The central axis is defined by the sloped V-shaped groved sidewall members 23 that are integral with the carriage 4 because a bottom surface of spring 24, held in place by screws 25, depresses the rotation fulcrum pin 21 into the grooves. As a result, the first magnetic head 2 can be moved away from the second magnetic head 3 against the closing force provided by arm pressurizing spring 22 while avoiding interference with the hard case 12 as it is inserted.

In the disk device according to the present invention, unlike the conventional device in which the fulcrum of swing for the arm is provided by the leaf spring 6, the pin 21 provides the fulcrum. The pin 21 is also supported by the V-shaped grooved members 23 and urged in one direction by the spring 24.

Figure 1:
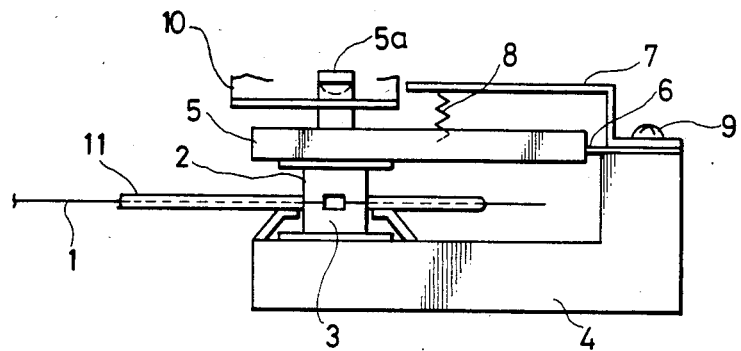
FIG. 1 is a side view of a conventional magnetic disk device.
Figure 2:
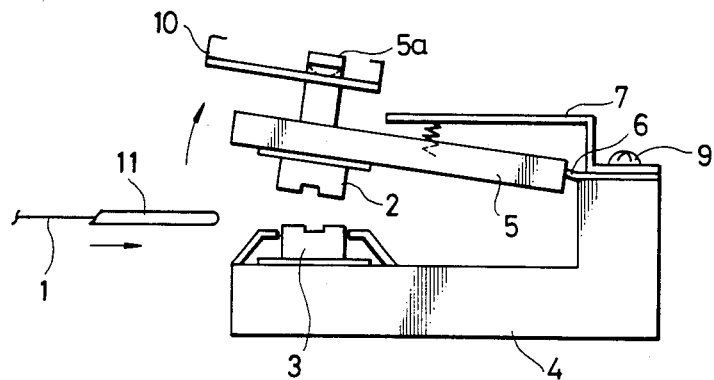
FIG. 2 is a side view showing an arm raised in the device of FIG. 1.
Figure 3:
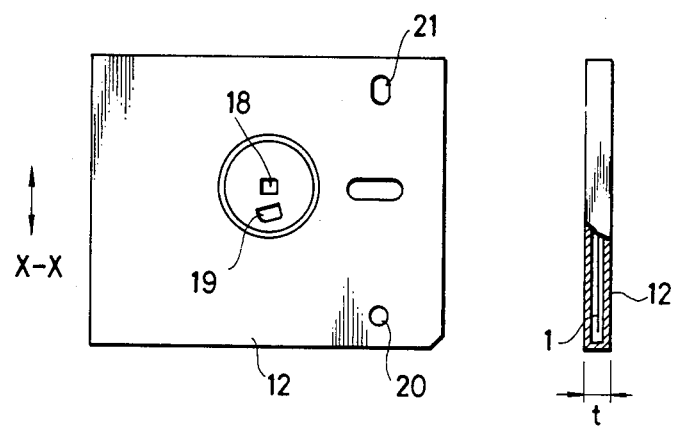
FIG. 3 is a plan view showing a flexible disk mounted in a hard case.

In the conventional device of FIGS. 1 and 2, the opening stroke of the arm 5 is determined from the limit on stress that can be placed on the leaf spring 6. In contrast, in the device of the present invention, the fulcrum of swing for the arm 5 is provided by the pin supporting structure 23 and, therefore, the arm can have a sufficient opening stroke to prevent interference of the first magnetic head 2 with the hard case 12. Because of the rotation fulcrum pin 21, the opening stroke of the arm 5 is not substantialy limited; that is, the arm can be swung at least 90° as indicated in the one-dot chain lines in FIG. 7. The disk device according to the present invention is designed to eliminate the drawbacks accompanying the conventional device that result in difficulty in maintenance due to difficulty in observing the contact surface of the first magnetic head 2.

As was described before, another drawback of the conventional device is that the leaf spring 6 of the arm 5 is twisted by the moment produced by the difference between the position of the lift member 5a and the arm pressurizing position. As a result, the stroke of the lift member is shorter than that of the first magnetic head 2. In contrast, in the present invention, in FIGS. 6 and 7, the rotation fulcrum pin 21 is integral with the arm 5 and is sufficiently rigid with respect to the twisting force at the fulcrum to avoid twisting. As a result, the stroke of the lift member 5a and the first magnetic head 2 can be substantially equal to each other and the reduction in the available stroke of the first magnetic head 2 in the conventional device can be eliminated.

Figure 4:
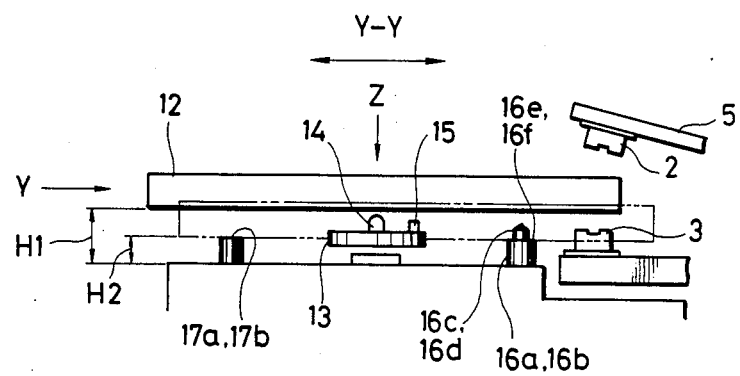
FIG. 4 illustrates the construction of the device which uses the hard case.
Figure 5:
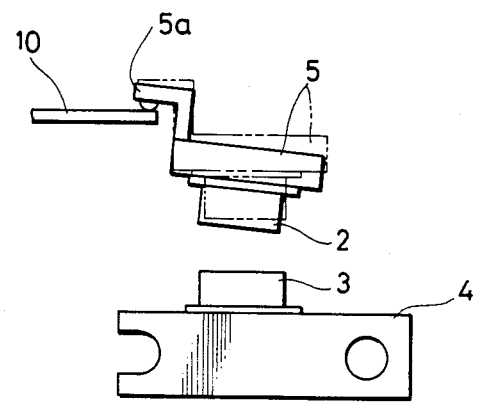
FIG. 5 is a diagram used for describing difficulties accompanying the conventional device.

In the above-described invention, the rotation fulcrum pin 21 is supported by the V-shaped groove members 23 and the relative position of the carriage 4 and the arm 5 can be determined merely by placing the rotation fulcrum pin 21 of the arm 5 on the sloped sidewalls of the V-shaped groove members 23, which contributes to the simplicification in the assembly process and improves manufacturing productivity. The leaf springs 24 are used to indirectly support the rotation fulcrum pin 21; that is, the leaf springs 24 depress the pin 21 against the sloped sidewalls of the V-shaped groove members 23. A displacement of the head 2 radially with respect to the flexible disk 1 (in the Y—Y direction of FIG. 4); that is, a head alignment error factor which must be taken seriously in designing the magnetic disk device and which causes a displacement of the first and second magnetic heads relative to each other will not occur in the device according to the present invention. The displacment error will not occur to a significant extent even if the sloped sidewalls of the V-shaped grooves are worn out over time by rotation of the rotation fulcrum pin 21 because the latter is stably positioned due to leaf springs 24 pushing the pin 21 against the sloped sidewalls.

Figure 8:
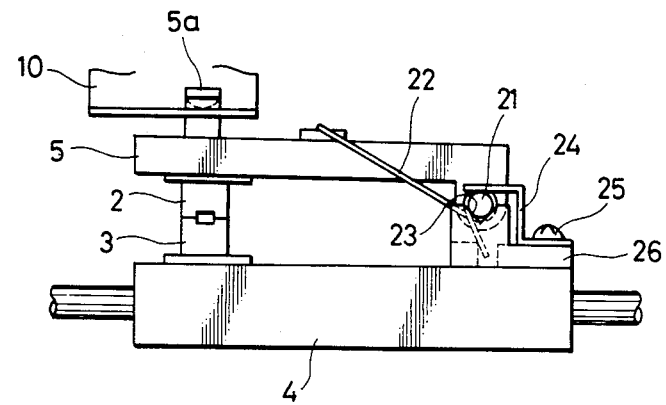
FIG. 8 is, a side view showing a modificaton of the device in FIGS. 6 and 7.
Figure 9:
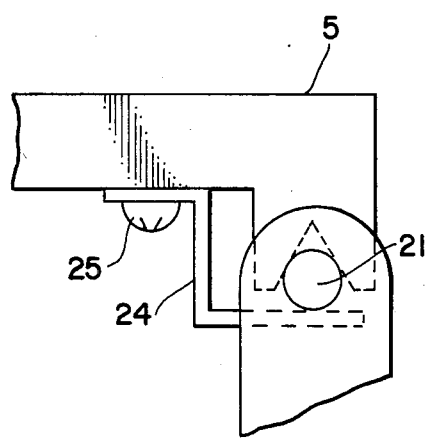
FIG. 9 shows a further modification.

In the embodiment of FIGS. 6 and 7, the V-shaped groove members 23 are integral with the carriage 4. However, the embodiment may be modified so that supporting members 26 including V-shaped groove members 23 are provided separately from the carriage 4, as illustrated in FIG. 8, and the groove members can be secured to the carriage 4 with screws 25. The first magnetic head 2 can then be adjusted independently of the second magnetic head 3 by loosening the screws 25. In this embodiment, the alignment accuracy of the components can be increased because mechanical errors can be removed by adjusting the position of the supporting member 26. As a result, a head arm supporting mechanism in which the relative position of the magnetic heads can be maintained with high accuracy can be provided at a lower manufacturing cost. A further modification is possible where the fulcrum pin 21 is integral with the supporting member 26, as illustrated in FIG. 9.

As will be recognized by those of skill in the art, the present invention can be effectively applied to magnetic disk device using a flexible jacket.

The many features and advantages of the invention are apparent from the detailed specification and, thus, it is intended by the appended claims to cover all such features and advantages of the mechanism which fall within the true spirit and scope of the invention. Further, since numerous modifications and changes will readily occur to those skilled in the art, it is not desired to limit the invention to the exact construction and operation illustrated and described, and, accordingly, all suitable modifications and equivalents may be resorted to, falling within the scope of the invention.

What is claimed is:

1. A magnetic disk head opening apparatus, for a flexible magnetic disk having magnetic recording layers on both sides, allowing opening to a vertical position from a normal horizontal position, said apparatus comprising:
   a carriage;
   a first magnetic head provided on said carriage;
   an arm;
   a second magnetic head provided on said arm which is rotatable with respect to said carriage, said first and second magnetic heads arranged to confront each other through the flexible disk; and
   a rotation mechanism comprising:
      a supporting member having a pair of V-shaped grooves arranged spaced apart from each other in a line forming a rotation space;
      a pair of rotation fulcrum pins arranged in correspondence to said pair of V-shaped grooves, rotatably supported by said pair of V-shaped grooves and coupled to said arm, the rotation space allowing said arm to rotate from the normal horizontal position to substantially the vertical position exposing the second magnetic head for examination without decoupling said arm from said carriage;
      a closure spring coupled between said arm and said carriage, and urging said arm to rotate about said fulcrum pins; and
      a pair of elastic urging members which urge said rotation fulcrum pins into contact with said V-shaped grooves at all times.

2. An apparatus as recited in claim 1, wherein said supporting member is provided on said carriage, said rotation fulcrum pins are provided on said arm, and said elastic urging members have first ends, and said apparatus further comprises screws for securing the first ends to said carriage.

3. An apparatus as recited in claim 1, wherein said pair of rotation fulcrum pins are integral with said carriage.

4. An apparatus as recited in claim 1, wherein said pair of rotation fulcrum pins are integral with said arm.

5. An apparatus as recited in claim 1, wherein said supporting member comprises a base member having a projection length that supports said arm a predetermined distance above said carriage preventing said arm from contacting said carriage during rotation of said arm.

6. An apparatus as recited in claim 5, wherein said rotation mechanism allows said arm to rotate through substantially ninety degrees with respect to said carriage.

7. A double-side recording type magnetic disk apparatus for a flexible disk allowing opening to a vertical position from a normal horizontal position, comprising:
   two magnetic heads disposed on both sides of the flexible disk where the flexible disk can be subjected to writing and reading;
   an arm supporting at least one of said magnetic heads and having a rotation fulcrum;
   a carriage supporting the rotation fulcrum;
   a rotation fulcrum pin integral with said arm and providing the rotation fulcrum;
   a closure spring coupled between said arm and said carriage and urging said arm to rotate about the rotation fulcrum;
   supporting members supporting said pin, each supporting member having a V-shaped groove for holding said pin and forming a rotation space allowing said arm to rotate to substantially the vertical position from the normal horizontal position exposing the at least one magnetic head for horizontal inspection without decoupling said arm from said carriage; and
   urging members, abutting said pin for urging said pin into contact with said V-shaped grooves.

8. An apparatus as recited in claim 7, wherein said supporting member compriess a base member having a projection length that supports said arm a predetermined distance above said carriage preventing said arm from contacting said carriage during rotation of said arm.

9. An apparatus as recited in claim 8, wherein said rotation mechanism allows said arm to rotate through substantially ninety degrees with respect to said carriage.

* * * * *